US012589044B2

(12) United States Patent
Jordan

(10) Patent No.: US 12,589,044 B2
(45) Date of Patent: Mar. 31, 2026

(54) SYSTEMS AND METHODS FOR A HYPERBARIC CHAMBER

(71) Applicant: Jordan Analytics & Research, LLC, Brandon, MS (US)

(72) Inventor: Christina D. Jordan, Brandon, MS (US)

(73) Assignee: Jordan Analytics & Research, LLC, Brandon, MS (US)

( * ) Notice: Subject to any disclaimer, the term of this patent is extended or adjusted under 35 U.S.C. 154(b) by 838 days.

(21) Appl. No.: 17/324,037

(22) Filed: May 18, 2021

(65) Prior Publication Data

US 2021/0353485 A1 Nov. 18, 2021

Related U.S. Application Data

(60) Provisional application No. 63/101,804, filed on May 18, 2020.

(51) Int. Cl.
*A61G 10/02* (2006.01)

(52) U.S. Cl.
CPC .................................. *A61G 10/026* (2013.01)

(58) Field of Classification Search
CPC .. A61H 31/02; A61G 10/026; A61G 2203/34; A61G 2203/46; A61G 10/023; A61G 10/00; A61G 10/02; A61G 2203/30; A61G 2203/42; A01K 1/03; A01K 1/031
USPC ..................................... 128/205.26; 119/420
See application file for complete search history.

(56) References Cited

U.S. PATENT DOCUMENTS 3,557,785 A * 1/1971 McQueen ............. A61M 16/00 119/420
4,633,859 A * 1/1987 Reneau ................ A61G 10/026 128/205.26
5,010,608 A * 4/1991 Barnett .............. A61G 7/05776 5/713
5,297,502 A * 3/1994 Jaeger ...................... A61D 7/04 119/420
5,327,904 A * 7/1994 Hannum .............. A61G 10/026 128/205.25
5,618,126 A * 4/1997 Watt ..................... A61G 10/026 403/3
5,935,516 A * 8/1999 Baugh ....................... B01L 1/00 422/1
8,251,057 B2 * 8/2012 Butler ................... B63C 11/325 128/202.19
9,186,232 B1 * 11/2015 Otto ..................... A61G 10/026
10,751,232 B1 * 8/2020 Ilao ...................... A61G 5/1051
2002/0144683 A1 * 10/2002 Gurnee ................ A61G 10/026 128/205.24

(Continued)

OTHER PUBLICATIONS

Kombucha Keg—Ball Lock 5 Gallon Rubber Top—Brand New Model:KOM-5RB Beverage Factory https://www.beveragefactory.com/kombucha/kombucha-kegs/kom-5rb_rubber_handle_ball_lock_keg.html?gclid=CjwKCAjwmqKJBhAWEiwAMvGt6FDwZhWkk04zbaTI89qq3QaO--fmRErpennwD0Qlb-TV6rEPwffFGRoCQO8QAvD_BWE.

*Primary Examiner* — Colin W Stuart
(74) *Attorney, Agent, or Firm* — Kumar Maheshwari; Mahesh Law Group PC

(57) ABSTRACT

A hyperbaric chamber includes a chamber that is configured to seal a volume of air. The chamber includes one or more ports that are configured to connect to an air supply and one or more platforms inside the chamber. The chamber includes one or more sensors that monitor an environment inside the chamber.

18 Claims, 8 Drawing Sheets

(56) References Cited

U.S. PATENT DOCUMENTS

| | | | | |
|---|---|---|---|---|
| 2002/0177117 | A1* | 11/2002 | Wolf, Jr. | A01N 1/0247 435/284.1 |
| 2003/0232114 | A1* | 12/2003 | Dekleva | A23L 2/54 424/600 |
| 2004/0193234 | A1* | 9/2004 | Butler | A61N 5/0616 128/205.26 |
| 2004/0236174 | A1* | 11/2004 | Boone | A61B 5/7435 600/21 |
| 2008/0210234 | A1* | 9/2008 | O'Brien | A61G 10/026 128/202.12 |
| 2008/0313816 | A1* | 12/2008 | Bohm | A61G 7/05715 5/713 |
| 2009/0038618 | A1* | 2/2009 | Grauke | A61G 10/026 119/416 |
| 2010/0059059 | A1* | 3/2010 | Evans | A61G 10/026 128/205.26 |
| 2012/0065576 | A1* | 3/2012 | Stryker | A61M 35/30 604/20 |
| 2013/0047988 | A1* | 2/2013 | Delp, II | A61M 16/085 128/204.22 |
| 2015/0182722 | A1* | 7/2015 | Lesch | A61G 10/02 600/22 |
| 2017/0100294 | A1* | 4/2017 | Acevedo | A61G 10/026 |
| 2018/0153435 | A1* | 6/2018 | Rapoport | A61G 11/005 |
| 2019/0321246 | A1* | 10/2019 | Moodie | A47K 13/005 |
| 2020/0078238 | A1* | 3/2020 | Huang | A61G 7/012 |
| 2020/0390628 | A1* | 12/2020 | Gadgil | A61B 5/6892 |
| 2021/0128381 | A1* | 5/2021 | K. | A61G 7/018 |
| 2021/0330918 | A1* | 10/2021 | Menezes | A61G 10/005 |
| 2024/0307246 | A1* | 9/2024 | Harch | A61M 21/00 |

* cited by examiner

SYSTEMS AND METHODS FOR A HYPERBARIC CHAMBER

CROSS REFERENCE TO PRIOR APPLICATION

This application claims the benefit of U.S. Provisional Patent Application No. 63/101,804 filed May 18, 2020, which is incorporated by reference in its entirety.

FIELD OF THE INVENTION

This disclosure relates to high pressure chambers for medicine and scientific research.

BACKGROUND

Hyperbaric oxygen (HBO) therapy has gained much interest in clinical settings for a number of ailments, but it has become an especially important asset in the medical armamentarium for its use in expediting wound recovery. HBO has been approved for such conditions due to infection such as clostridial myonecrosis (or gas gangrene), necrotizing soft tissue infections, Fournier's gangrene, and osteomyelitis and such off-label indications as osteonecrosis of the jaw (ONJ). It is also currently under investigation for its capacity to improve outcomes associated with senility, stroke, multiple sclerosis, high altitude illness, myocardial infarction, brain injuries, migraine, glaucoma, head injuries, management of chronic fatigue in HIV patients, and enhancement of survival in free flaps.

HBO, as a specialized medical service, is not readily available. Accordingly, there is little research done on how HBO may affect various ailments. On a smaller scale, there is a dearth of research on the effects of HBO on biological samples at high pressure >3 atm. One of the most pressing limitations is the hardware needed for such research. A simple containment vessel that can be pressurized in a research environment does not exist. Thus, the research necessary to advance and direct HBO therapy is limited. There is a need in the art for an inexpensive hyperbaric chamber that may be used on small scale scientific research.

SUMMARY

A general aspect of the disclosed invention is a hyperbaric chamber. The hyperbaric chamber includes a chamber that is configured to seal a volume of air. The chamber includes one or more ports that are configured to connect to an air supply and one or more platforms inside the chamber. The chamber includes one or more sensors that monitor an environment inside the chamber. The tank may be configured to seal a pressure of up to about 60 pounds per square inch. The hyperbaric chamber may further include one or more window ports. The hyperbaric chamber may further include a regulator that maintains a pressure inside the chamber where the one or more sensors comprise a pressure sensor for gas inside the chamber. The hyperbaric chamber may further include a control that is accessible from an individual outside the chamber. The control may transmit a signal to activate one or more components inside the chamber. The chamber may include a stainless steel material. The chamber may further include a cylinder. The chamber may have a length of between about 26 to 32 inches. The length of the cylinder may be about 29 inches. The cylinder may have a diameter of between about 7 to 11 inches. The cylinder may have a diameter of about 9 inches. The hyperbaric chamber may further include a lighting source inside the chamber.

The lighting source may be a light emitting diode ("LED"). The hyperbaric chamber may further include a battery that supplies power to the LED. The one or more sensors may include a thermometer where the thermometer is configured to wirelessly transmit a temperature value.

An exemplary embodiment is a method. The method includes placing a biological sample inside a hyperbaric chamber and pressurizing the hyperbaric chamber with a gas. The hyperbaric chamber includes a stainless steel chamber and one or more sensors inside the stainless steel chamber. The hyperbaric chamber includes one or more platforms inside the stainless steel chamber. The gas may be 100% oxygen. The method may further include setting a target pressure of the hyperbaric chamber where the pressurizing includes adjusting a pressure of gas inside the hyperbaric chamber to meet the target pressure. The setting may include inputting one or more gas pressures and inputting a time to set each of the one or more gas pressures.

Another general aspect is a hyperbaric chamber. The hyperbaric chamber includes a chamber that is configured to seal a volume of air at a pressure of up to about 60 pounds per square inch. The chamber includes one or more ports that are configured to connect to an air supply and one or more platforms inside the chamber. The chamber includes one or more sensors that monitor an environment inside the chamber and one or more window ports and a regulator that maintains a pressure inside the chamber. The chamber includes a control that is accessible from an individual outside the chamber where the one or more sensors comprise a pressure sensor for gas inside the chamber and where the control transmits a signal to activate one or more components inside the chamber.

DETAILED DESCRIPTION

The disclosed subject matter provides a palpable research option for determining the effects of hyperbaric gas therapies alone or in combination with standard therapy treatments for viral and bacterial infections, in addition to hypoxia and related inflammatory diseases. The specifications for this invention include a chamber that is capable of achieving a high-pressure environment in order to study the effects of varied, high pressure gas systems (oxygen and air)

on the growth of infectious bacteria. In embodiments, various internal chamber modifications may allow this invention to be used to study any gas applications as a treatment option for in vivo, in vitro, and small animal research models.

The disclosed hyperbaric chamber is a sealable chamber that may be pressurized to at least 60 pounds per square inch (psi). Inside the sealable chamber are adjustable platforms, upon which, research of various forms may be performed. For example, testing the effects of high pressure on single celled organisms may be performed by placing containers of the single celled organisms on platforms in the sealable container and pressurizing the sealable container. One or more sensors may be installed to measure conditions inside the hyperbaric chamber. The one or more sensors may also take measurements of the samples that are placed inside the hyperbaric chamber.

Figure 1:
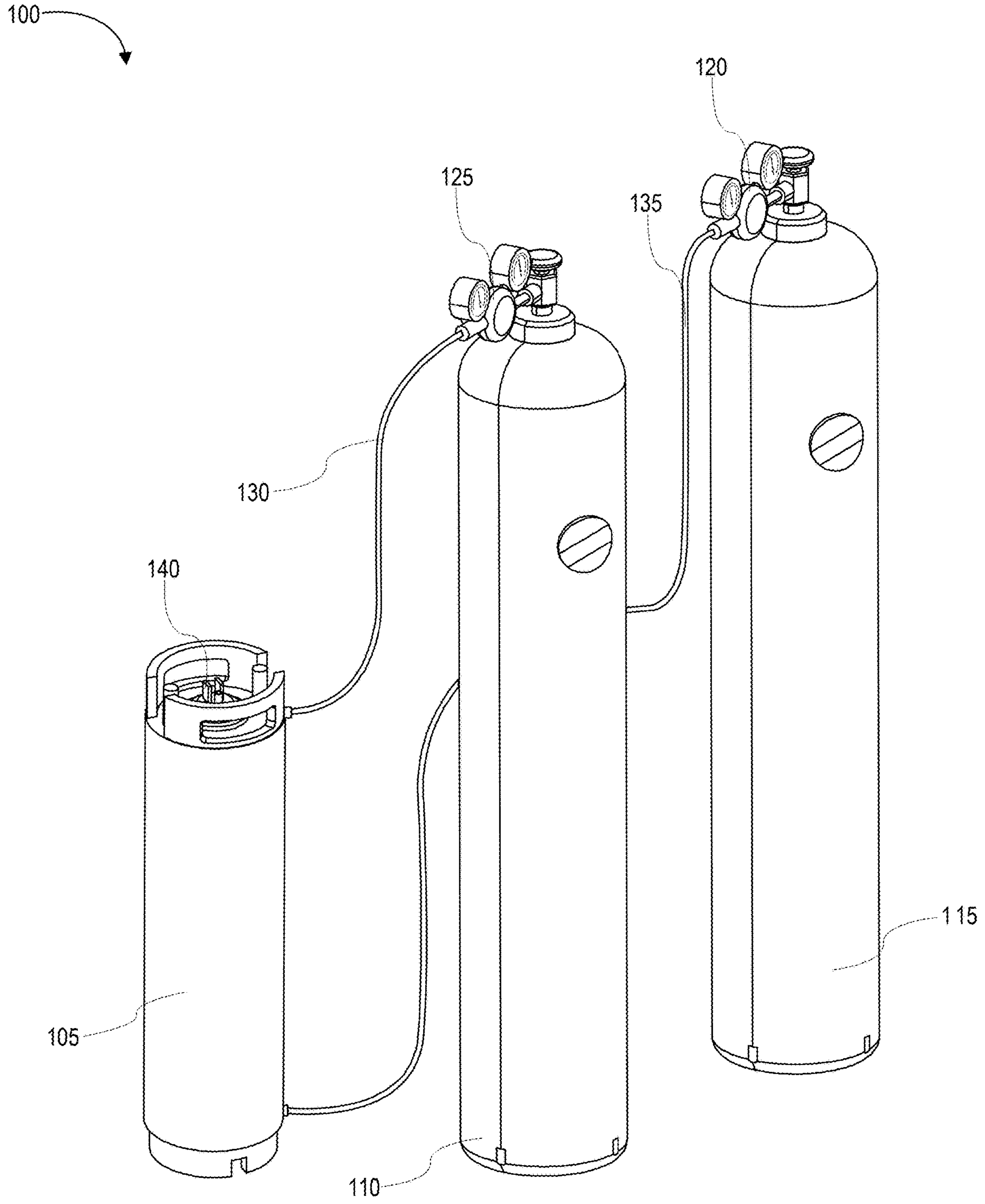
FIG. 1 is an illustration of a hyperbaric chamber that is attached to one or more compressed gas supplies.

Referring to FIG. 1, FIG. 1 is an illustration 100 of a hyperbaric chamber 105 that is attached to one or more compressed gas supplies. The hyperbaric chamber 105 is a hollow cylinder that may be pressurized to 60 psi. One or more sealable ports that are configured to accept various connected devices may be affixed to the hyperbaric chamber 105. Gas lines such as a line to an oxygen tank 115 may be connected to at least one of the one or more ports.

The hyperbaric chamber 105 may be pressurized to various pressures, depending on the needs and purposes of the user. For example, samples containing bacteria may be placed inside the hyperbaric chamber 105 before the hyperbaric chamber is pressurized with oxygen to various pressures to determine an effect of oxygen pressure on the bacteria. The hyperbaric chamber 105 may contain one or more doors 140 that allow the user to access the inside of the hyperbaric chamber 105. The door 140 may be reinforced to withstand high pressure inside the hyperbaric chamber 105 and remain closed. Various reinforcements that may seal the door 140 against the pressurized hyperbaric chamber include, but are not limited to latches, bars, and bolts.

Inside the hyperbaric chamber 105 may be one or more platforms whereby samples may be placed. The one or more platforms may be adjustable to accommodate various research purposes. For example, a platform in the hyperbaric chamber 105 may be adjusted to various positions inside the hyperbaric chamber 105. A position of the platform may be made to accommodate one or more sensors inside the hyperbaric chamber 105. In various embodiments, the one or more sensors may measure various conditions inside the hyperbaric chamber such as, but not limited to, temperature, humidity, light, sound, images, and the like. In an exemplary embodiment, measurements for the one or more sensors may be transmitted wirelessly from the hyperbaric chamber 105.

One or more gas supply lines may be connected to the hyperbaric chamber 105. As shown in FIG. 1, there are two gas supply lines. The first is an air line 130 that is connected to a gas tank 110 containing a compressed mixture of gases at a ratio found in ambient air. Also connected to the hyperbaric chamber is an oxygen line 135 that is connected to a tank 115 containing compressed oxygen. The gas tanks may have regulator 120 and regulator 125 affixed to control the output of gas from the gas tanks. With the regulators, a user may set a target pressure whereby the hyperbaric chamber is pressurized to the target pressure. In various embodiments, a regulator may be programmed with a timer, whereby the regulator automatically adjusts a pressure in the hyperbaric chamber based on the timer. This experimental setup may be used to pressurize the hyperbaric chamber 105 with any concentration of oxygen from a ratio of oxygen in ambient air conditions to a 100% oxygen composition.

Figure 2:
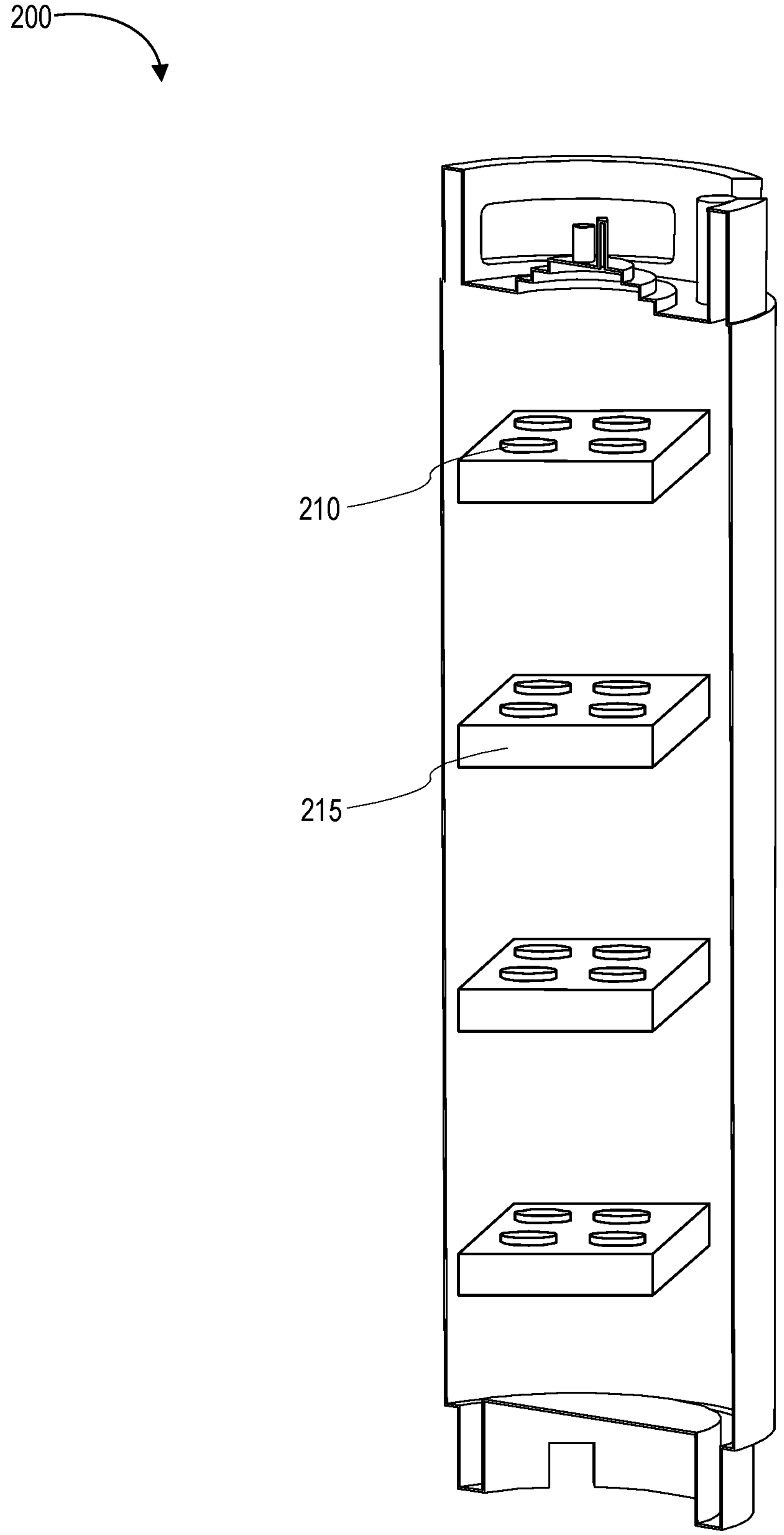
FIG. 2 is a cross-sectional view of a hyperbaric chamber showing internal sample platforms.

Referring to FIG. 2, FIG. 2 is a cross-sectional view of a hyperbaric chamber 200 showing internal sample platforms. The hyperbaric chamber 200 may comprise a variety of shapes and sizes. In an embodiment of the hyperbaric chamber 200 that is shown in FIG. 2, the hyperbaric chamber 200 has a cylindrical shape and is oriented vertically. Alternatively, the hyperbaric chamber 200 may comprise other shapes that are capable of maintaining a high internal pressure.

In an exemplary embodiment, the hyperbaric chamber 200 may have a total height of about 29 inches. A diameter of the cylindrical shape may be about 9 inches. Further, the total height of the hyperbaric chamber 200 may include a rubber portion on the top and bottom ends of the cylindrical shape. In one example, the hyperbaric chamber 200 includes a rubber base of about 3 inches on the bottom end of the hyperbaric chamber 200. Similarly, the hyperbaric chamber 200 may include a rubber handle of about 3 inches on the top of the hyperbaric chamber 200. The center of the hyperbaric chamber 200 may be constructed of a stainless steel material and have a height of about 23 inches. As such, the aggregated height of the 3 inch bottom, 3 inch top, and 23 inch center is 29 inches.

The shape and core dimensions of the hyperbaric chamber allow it to be safely pressurized to at least 60 psi or 4 atmospheres. Although the hyperbaric chamber may comprise a variety of shapes and size, the internal volume of the hyperbaric chamber in the dimensions described herein has is about 18.9 liters (5 gallons) and weighs about 49 pounds. In various embodiments, the hyperbaric chamber 200 has an aggregated height of between about 26 to 32 inches. Also in various embodiments, the hyperbaric chamber has a diameter of between about 7 to 11 inches.

Inside the hyperbaric chamber 200 are at least one adjustable platform 215. The adjustable platform 215 may have its height, width, rotation, and position adjusted within the hyperbaric chamber 200. For example, the platform 215 may be moved to accommodate a multitude of biological samples 210 that are placed on the platform 215. Further, and as shown in FIG. 2, the hyperbaric chamber 200 may contain many platforms 215, on each of which biological samples or other items may be placed. In one example of an adjustable platform, the inner walls of the hyperbaric chamber 200 may comprise a multitude of slots that are sized to accommodate the platforms 215. Each of the platforms 215 may thus be inserted into one of the multitude of slots depending on the space requirements of the individual platforms 215.

In one instance, petri dishes containing biological material such as bacteria may be placed on the platforms 215. A user may position the platforms by reaching into the hyperbaric chamber 200 through a door 140 of the hyperbaric chamber 200. Likewise, a user may gain access to the various biological samples via the door 140. Once the platforms are positioned and biological samples appropriately assembled and placed, the hyperbaric chamber 200 may be sealed and pressurized according to experimental conditions set by the user. In one example. a user may test an effect that 3 atmospheres pressure of pure oxygen has on the bacteria.

Other types of biological samples may include various single celled organisms or other small biological samples. Examples of other small biological samples may include small plants, fungi, or animal samples, which may be similar placed on platforms within containers. A user may place one or more sensors within the hyperbaric chamber 200 to monitor the samples and conditions within the hyperbaric chamber. For example, a thermometer may be placed within the hyperbaric chamber to monitor a temperature increase due to adiabatic heating or cooling, under which the temperature inside the hyperbaric chamber 200 changes due to a change in pressure.

Figure 3:
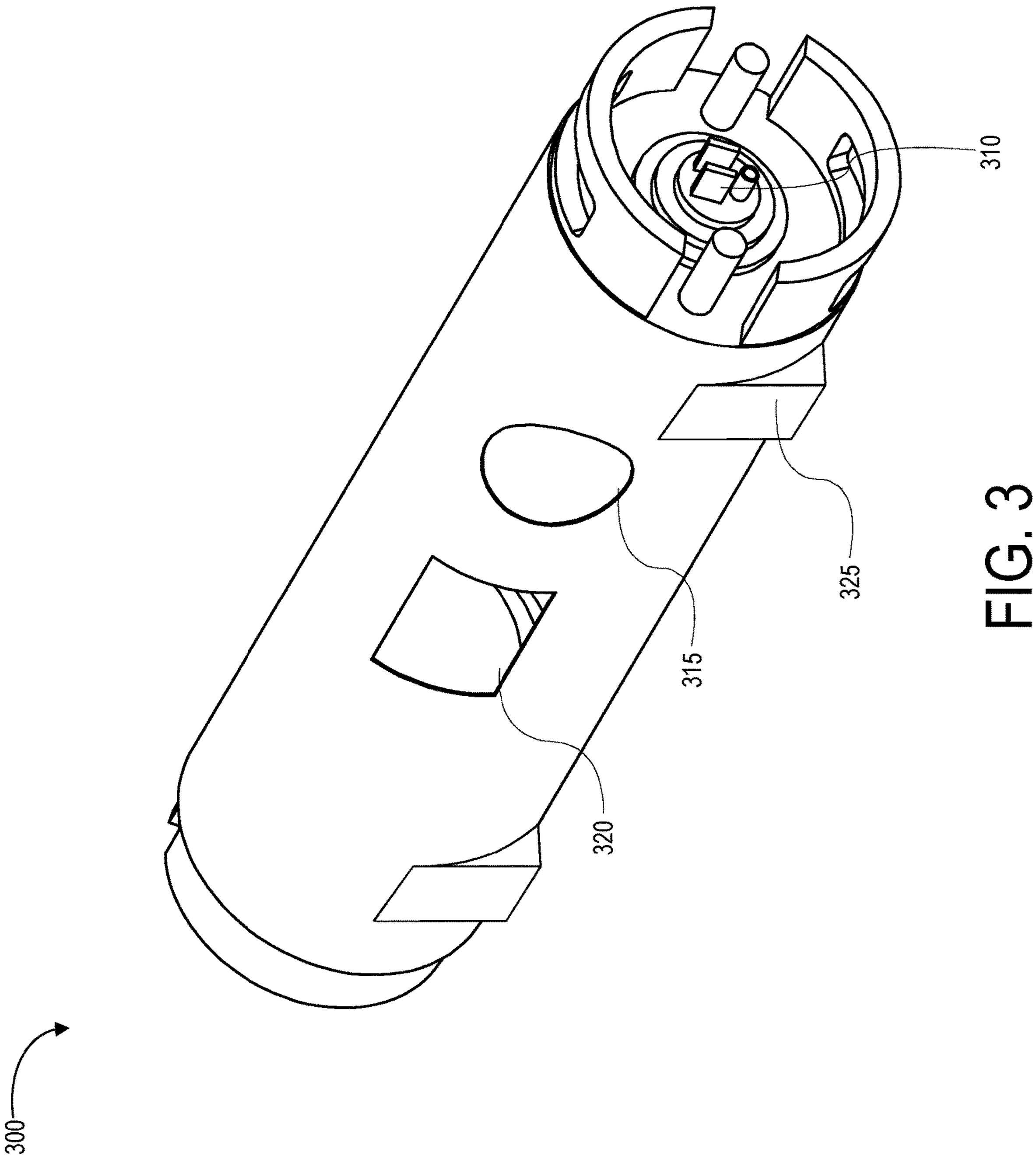
FIG. 3 is a perspective view of an embodiment of a hyperbaric chamber that is oriented horizontally to the ground.

Referring to FIG. 3, FIG. 3 is a perspective view of an embodiment of a hyperbaric chamber 300 that is oriented horizontally to the ground. The hyperbaric chamber 300 may comprise a multitude of shapes and sizes. Further, the hyperbaric chamber 300 may be configured to be oriented in multiple ways. The embodiment of the hyperbaric chamber shown in FIG. 3 shows a cylindrically shaped hyperbaric chamber 300 that is oriented with the length of the cylindrical shape parallel to the ground.

Supports 325 on the ground may prop the hyperbaric chamber 300 to a fixed position in a room. In various embodiments, the hyperbaric chamber 300 may be placed on a movable platform whereby the supports are built into the moveable platform such as a platform that can be raised and lowered. The hyperbaric chamber 300 may include one or more doors 310 that give a user access to the interior of the hyperbaric chamber 300.

In various embodiments, the door 310 may comprise a flange that rotates on a hinge. The rotatable flange may be closed to seal the hyperbaric chamber. Once closed, a multitude of bolts may be tightened to seal the door 310 and allow the hyperbaric chamber to be pressurized. The door 310 may be of various shapes or dimensions that can withstand high pressures inside the hyperbaric chamber 300.

Additionally, the hyperbaric chamber may include one or more windows, which allow a user to observe the interior of the hyperbaric chamber 300. Further, the one or more windows may allow light to penetrate the interior of the hyperbaric chamber 300, which may be a required condition for various experimental setups. As shown in FIG. 3, the one or more windows may comprise various shapes such as a circular window shape 315 and square window shape 320. The one or more windows may be constructed of various transparent materials that can withstand high pressures inside the hyperbaric chamber. For example, the one or more windows may be constructed of high thickness soda-lime-silica glass that is fused to a stainless-steel frame.

Figure 4:
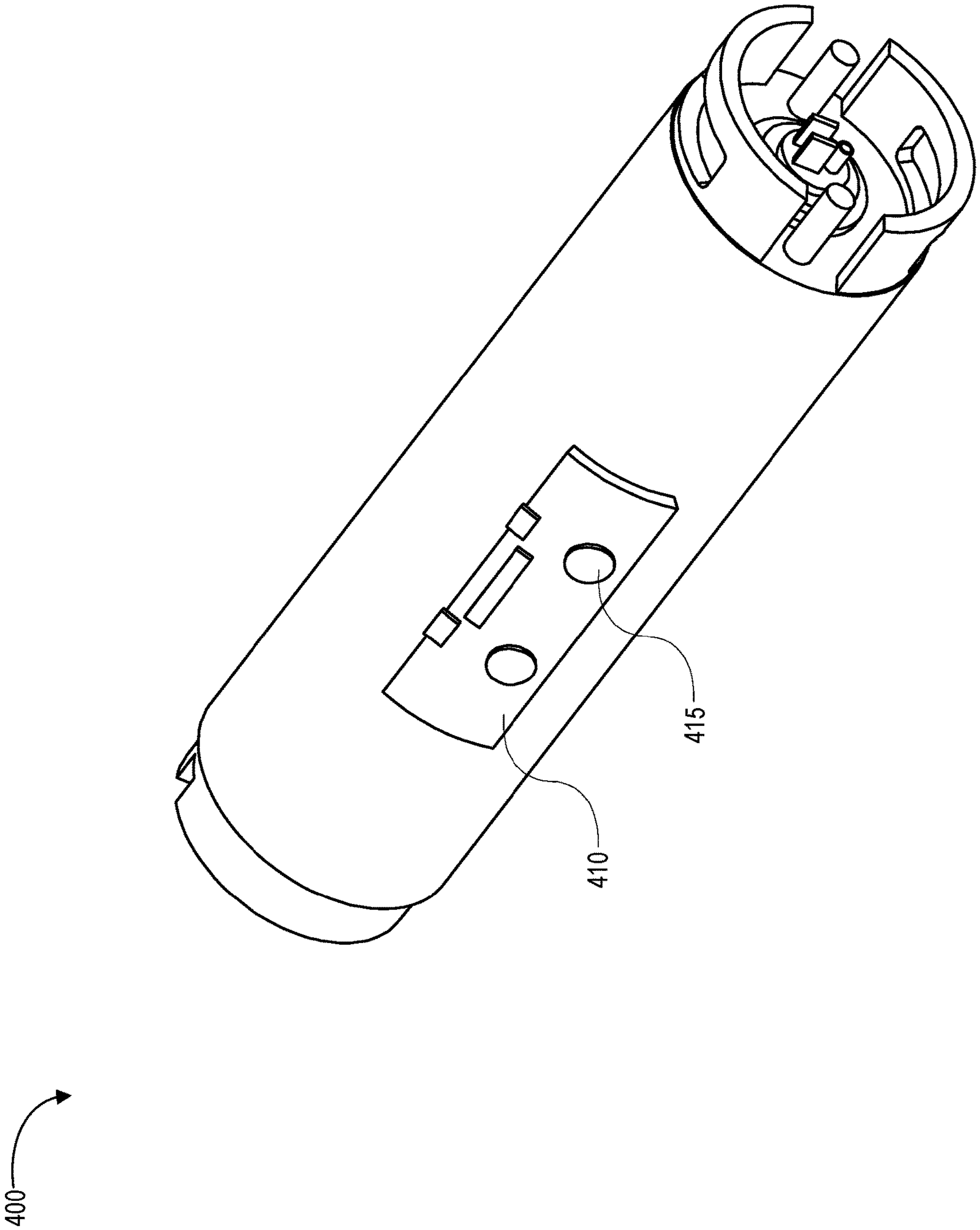
FIG. 4 is a perspective view of the embodiment of a hyperbaric chamber that is oriented horizontally to the ground.

Referring to FIG. 4, FIG. 4 is a perspective view of the embodiment of a hyperbaric chamber 400 that is oriented horizontally to the ground. Like the hyperbaric chamber 300 that is shown in FIG. 3, the embodiment of the hyperbaric chamber 400 shown in FIG. 4 has a cylindrical shape whereby the length of the cylindrical shape is oriented in parallel with the ground. A user may, for instance, place the hyperbaric chamber at various positions in a lab.

The hyperbaric chamber 400 may comprise one or more ports to which one or more gas lines may be connected to pressurize the hyperbaric chamber 400. The door 410 on the hyperbaric chamber 400, which allows a user to access the interior of the hyperbaric chamber 400, may be built into various positions. For instance, the hyperbaric chamber 300 shown in FIG. 3 has a door 310 built into an end of the cylindrical shape that makes up the hyperbaric chamber 300. In the embodiment shown in FIG. 4, the door 410 is built into a side of the cylindrical shape, which may give a user better access to the interior of the hyperbaric chamber 400.

Additionally, the door 410 has a square shape and is curved to fit into the side of the cylindrical shape. Alternatively, the door 310 shown in FIG. 3 has a circular shape that is flat. In various embodiments, a hyperbaric chamber may comprise both the door 310 shown in FIG. 3 and the door 410 shown in FIG. 4, allowing users access to the interior from both doors.

The door 410 includes two circular shaped windows 415. The windows 415 may allow users to see within the hyperbaric chamber 400. Further, and because the windows 415 are built into the door 410, the user may easily reach the windows 415 to clean them or effectuate repairs on the windows 415. The door 410, may swing open on hinges, as shown in FIG. 4. Alternatively, the door 410 may be affixed to the hyperbaric chamber 400 via removable bolts. The removable bolts may be spaced about a circumference of the door 410 and tightened to seal the hyperbaric chamber 400.

Figure 5:
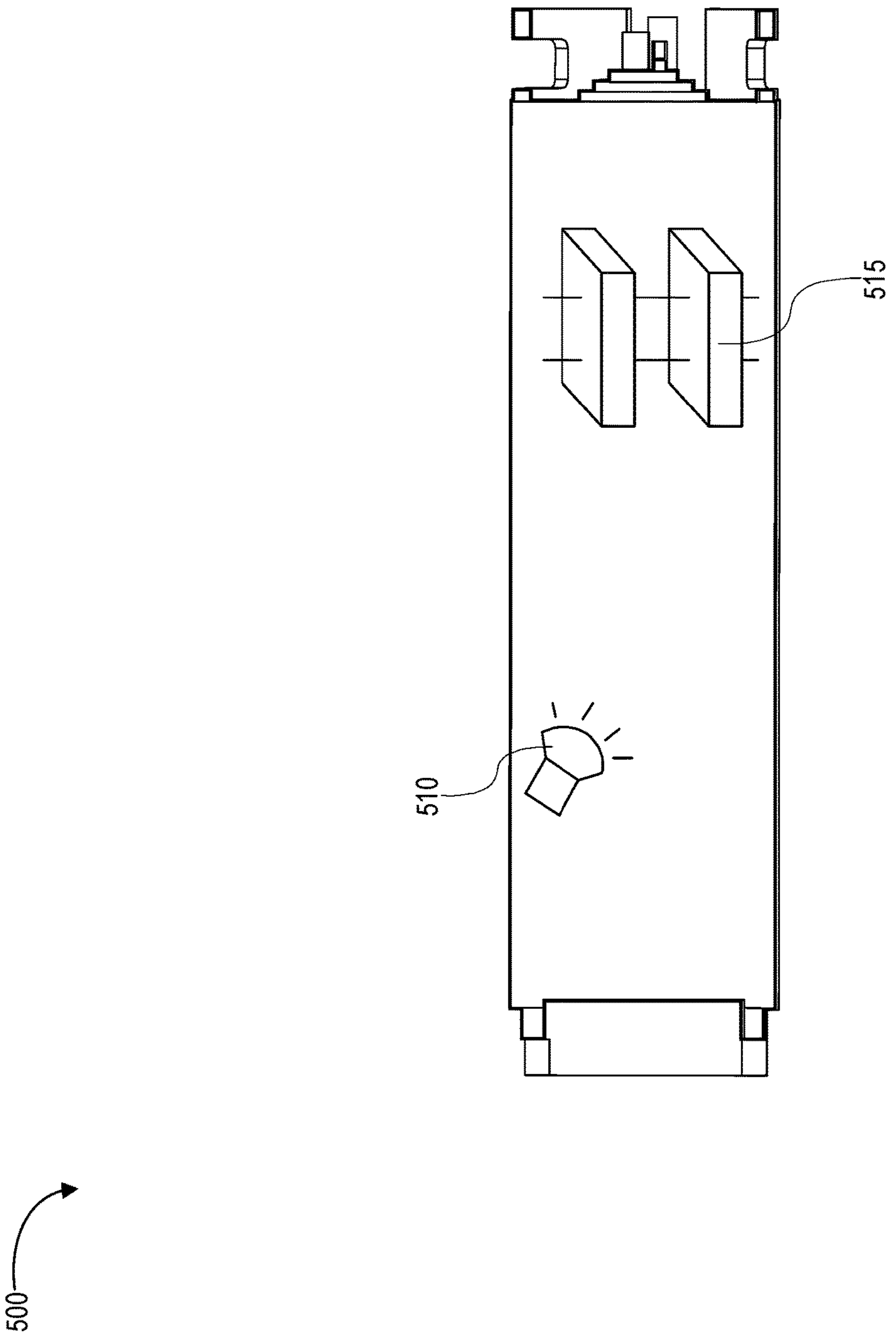
FIG. 5 is a cross-sectional view of the embodiment of a hyperbaric chamber that is oriented horizontally to the ground showing internal platforms.

Referring to FIG. 5, FIG. 5 is a cross-sectional view of the embodiment of a hyperbaric chamber 500 that is oriented horizontally to the ground showing internal platforms 515. Unlike the platforms shown in FIG. 2, the internal platforms 515 extend across the length of the hyperbaric chamber 500 when the hyperbaric chamber 500 is oriented horizontally, as shown in FIG. 5. As such, there is more space per platform for the relative dimensions of the hyperbaric chamber 500. Biological samples, sensors, equipment, containers, fixtures, and the like, may take up a greater platform space within the hyperbaric chamber 500.

The hyperbaric chamber 500 may include a light source 510 that can illuminate the interior of the hyperbaric chamber 500 with various wavelengths of light. In various experimental setups, a user may test an effect of light on biological samples. In experimental setups that observe live animals within the hyperbaric chamber 500, light may be required depending on the live animals. For instance, in an experimental setup that includes mice, the mice may require lighting for the experiment. In another instance, an effect of light on various single celled organisms under high pressure may be tested by including a light source 510 in the hyperbaric chamber.

The light source 510 and internal platforms 515 may be adjusted and modified in various ways. For example, one or more of the internal platforms 515 may be removed to make space for biological samples, sensors, or other equipment that may be place inside the hyperbaric chamber 500. The placement of the internal platforms 515 may be translated or rotated to various parts of the interior of the hyperbaric chamber 500. The light source 510 may comprise various lighting hardware including but not limited to LEDs. In various experimental setups, the light source may comprise a single color LED to narrow a wavelength range of light emitted.

A user may gain access to the interior shown in FIG. 5 via the one or more doors. For instance, where the hyperbaric chamber includes a door 410 on the side of the hyperbaric chamber, a user may easily access portions of the interior. Also, where the hyperbaric chamber includes a door 310 at one or both ends, a user may gain easy access to portions of the interior at the ends of the hyperbaric chamber.

Control and communication with the interior of the hyperbaric chamber 500 while it is in a sealed state may be accomplished in various ways. In an exemplary embodiment, the hyperbaric chamber 500 may include one or more ports which allow electrical power/transmission lines to traverse the wall of the hyperbaric chamber 500. For instance, sensors transmit collected data through a transmission port in the hyperbaric chamber 500. As such, the electrical/transmission port would be capable of transmitting electric power or signals into and out of the hyperbaric chamber 500 while the hyperbaric chamber 500 is sealed and pressurized.

In various embodiments, the control over fixtures and/or sensors in the interior of the hyperbaric chamber 500 may be performed through wireless communication while the hyperbaric chamber 500 is sealed. An advantage of wireless communication may be to allow that walls of the hyperbaric chamber 500 to have a simpler design with fewer ports and fewer points that may leak or break. In one example, a user may activate the light source 510 via a wireless signal that is sent from outside the hyperbaric chamber 500. The light source 510 could receive power from a battery power source that is inside the hyperbaric chamber 500. In another example of use, a user may initiate movement of one or more of the internal platforms 515 via a signal from outside the hyperbaric chamber 500. Among many possible designs for a movable platform, internal platforms 515 may be positioned, at least partly, by movement of linear actuators that are connected to the internal platforms 515. In another possible design, the platforms may be rotated into various angles depending on an experimental setup. For instance, a user may test an effect of light on a biological sample under pressurized conditions by varying an angle by which light from the light source 510 hits the biological sample.

Figure 6:
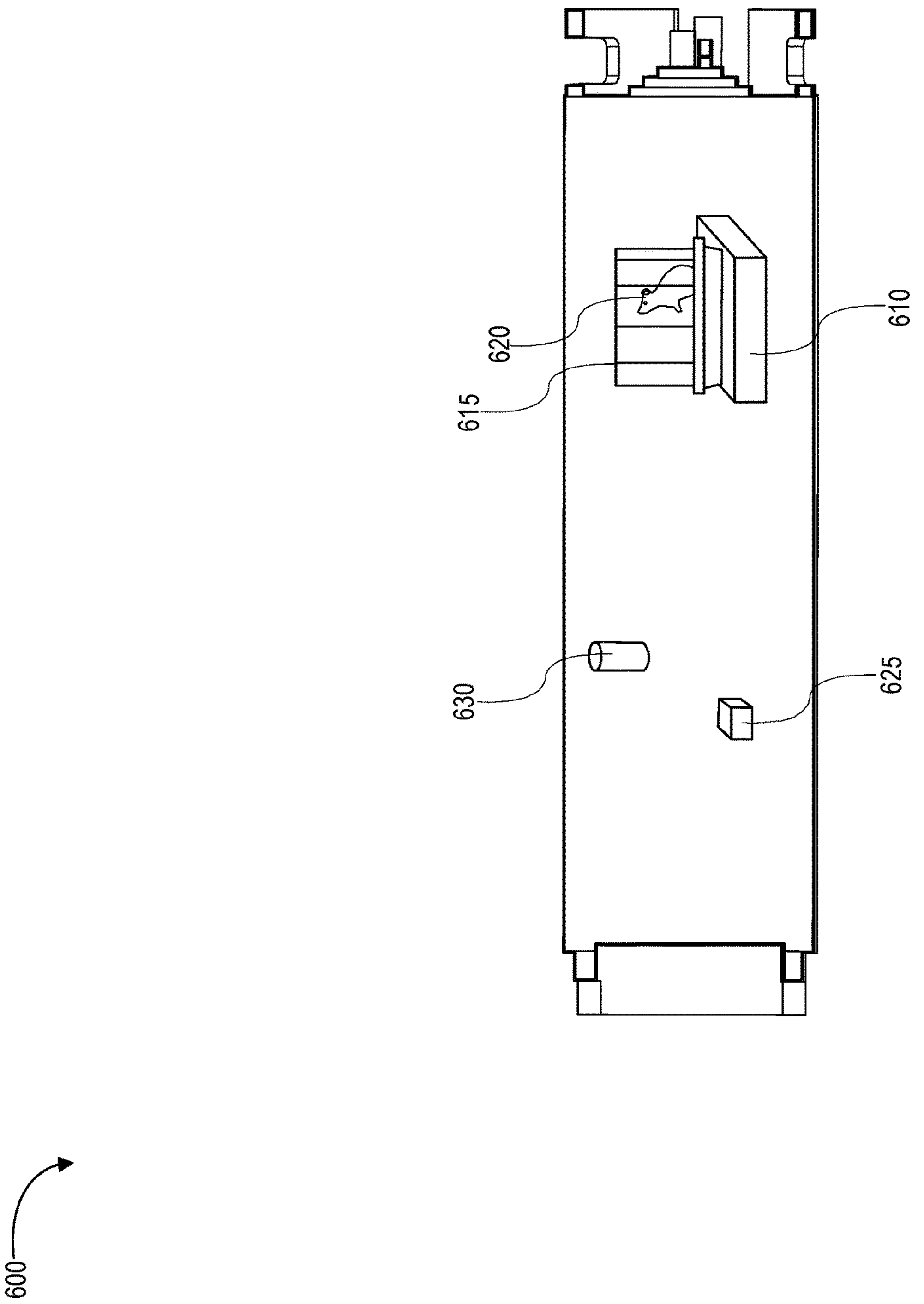
FIG. 6 is a cross-sectional view of the embodiment of a hyperbaric chamber that is oriented horizontally to the ground showing different internal components.

Referring to FIG. 6, FIG. 6 is a cross-sectional view of the embodiment of a hyperbaric chamber 600 that is oriented horizontally to the ground showing different internal components. Like the cross section of the hyperbaric chamber 500 shown in FIG. 5, the hyperbaric chamber 600 shown in FIG. 6 has an internal platform 610 that is oriented with a flat portion of the internal platform 610 that is aligned in parallel with the length of the cylindrical hyperbaric chamber. This orientation may allow for larger biological samples than the orientation of the hyperbaric chamber 200 shown in FIG. 2. There, the vertically oriented hyperbaric chamber 200 accommodates a large number of small biological samples that are contained within petri dishes.

The hyperbaric chamber 600 may include a wireless transceiver 625 that can both transmit and receive wireless signals from outside of the hyperbaric chamber 600. The wireless transceiver 625 may be configured to automatically transmit data that is collected from one or more sensors inside the hyperbaric chamber 600. For example, a sensor may comprise a temperature probe 630 that records a temperature reading, such as from air inside the hyperbaric chamber 600, substance, or the biological sample. Measurements of the temperature probe 630 may be automatically transmitted to a user by the wireless transceiver 625. Likewise, various other sensors inside the hyperbaric chamber 600 may transmit measurements to a user that is on the outside. For instance, a camera that is taking images of one or more biological samples, may transmit the camera images to a user outside the hyperbaric chamber 600. Thus, a user may collect various measurements from sensors while the hyperbaric chamber is pressurized.

In addition to collecting sensor data and transmitting the sensor data to a user, the wireless transceiver 625 may receive signals from a user to perform one or more actions. For instance, the wireless transceiver 625 may receive a signal to activate the light source 510 or to modify an output of the light source 510. In another instance, the wireless transceiver 625 may receive a signal to activate or modify a sensor inside the hyperbaric chamber 600. The one or more sensors, such as the temperature probe, may have multiple adjustable settings that may be changed by a signal from a user. In one example, a user may send a signal for a sensor to be turned on. Battery power for the one or more sensors may thus be preserved by the user until the sensor is needed. If the internal platform 610 is connected to a motor that can move or rotate the internal platform 610, the wireless transceiver 625 may be used to send signals to the motor to position the platform 610 while the hyperbaric chamber 600 is sealed and pressurized.

As shown in FIG. 6, the biological samples may comprise live animals 620 or other in vivo samples. Depending on the live animal 620, various additional structures, equipment, food, or the like, may be placed inside the hyperbaric chamber 600 for the study and care of the live animal 620. For example, a live animal cage 615 may be built into the internal platform of the hyperbaric chamber 600. In various embodiments, sensors inside the hyperbaric chamber 600 that measure the live animal 620 may trigger changes in the function of the hyperbaric chamber 600. For example, a sensor may take vital measurements of the live animal including, but not limited to animal temperature, animal heart rate, animal activity level, animal consciousness, animal food intake, and animal respiration rate. The hyperbaric chamber 600 may slow or cease pressurizing, in one case, where the vital measurements of the live animal 620 show that the change in pressure is having an adverse effect on the live animal 620. In another case where a positive effect of high pressure oxygen is tested on the live animal 620, the hyperbaric chamber 600 may automatically depressurize when vital measurements of the live animal 620 show that a positive effect is achieved.

In various embodiments, multiple biological samples and/or live animal samples may be placed inside the hyperbaric chamber at once. The one or more sensors may provide observational data on the biological samples and/or live animal samples while a user is on the outside of the hyperbaric chamber 600. The hyperbaric chamber 600 may be configured to automatically modify a pressure based on measurements of the biological samples. For example, the hyperbaric chamber 600 may be configured to adjust a pressure based on a response from a bacteria sample. A camera may record images of a bacteria sample or multiple samples to obtain a crude measure of the health of the bacteria sample. The hyperbaric chamber 600 may modify a pressure inside the hyperbaric chamber 600 based on the measurements of the bacteria samples.

Similarly, the hyperbaric chamber may modify a gas concentration based on measurements of live animals or other biological samples. For example, an interior of the hyperbaric chamber 600 may have an oxygen concentration of 100%. The hyperbaric chamber 600 may be configured to reduce the oxygen concentration at a set rate until a condition is met by the one or more sensors. For example, a condition may be a measurement that cells in a biological sample have an adverse effect. In another example, the hyperbaric chamber 600 may increase an oxygen concentration starting at 20% oxygen until sensors measure a response in one or more biological samples. For instance, sensors may measure an amount of oxygen saturation in tissues. The oxygen concentration of gas inside the hyperbaric chamber 600 may be increased until a condition for oxygen saturation in tissues is met. In another example, a camera records a rate of growth of a bacteria colony by optically measuring a size of the bacteria colony. The oxygen concentration in the hyperbaric chamber 600 may be adjusted to maximize or minimize the rate of growth of the bacteria colony.

Figure 7:
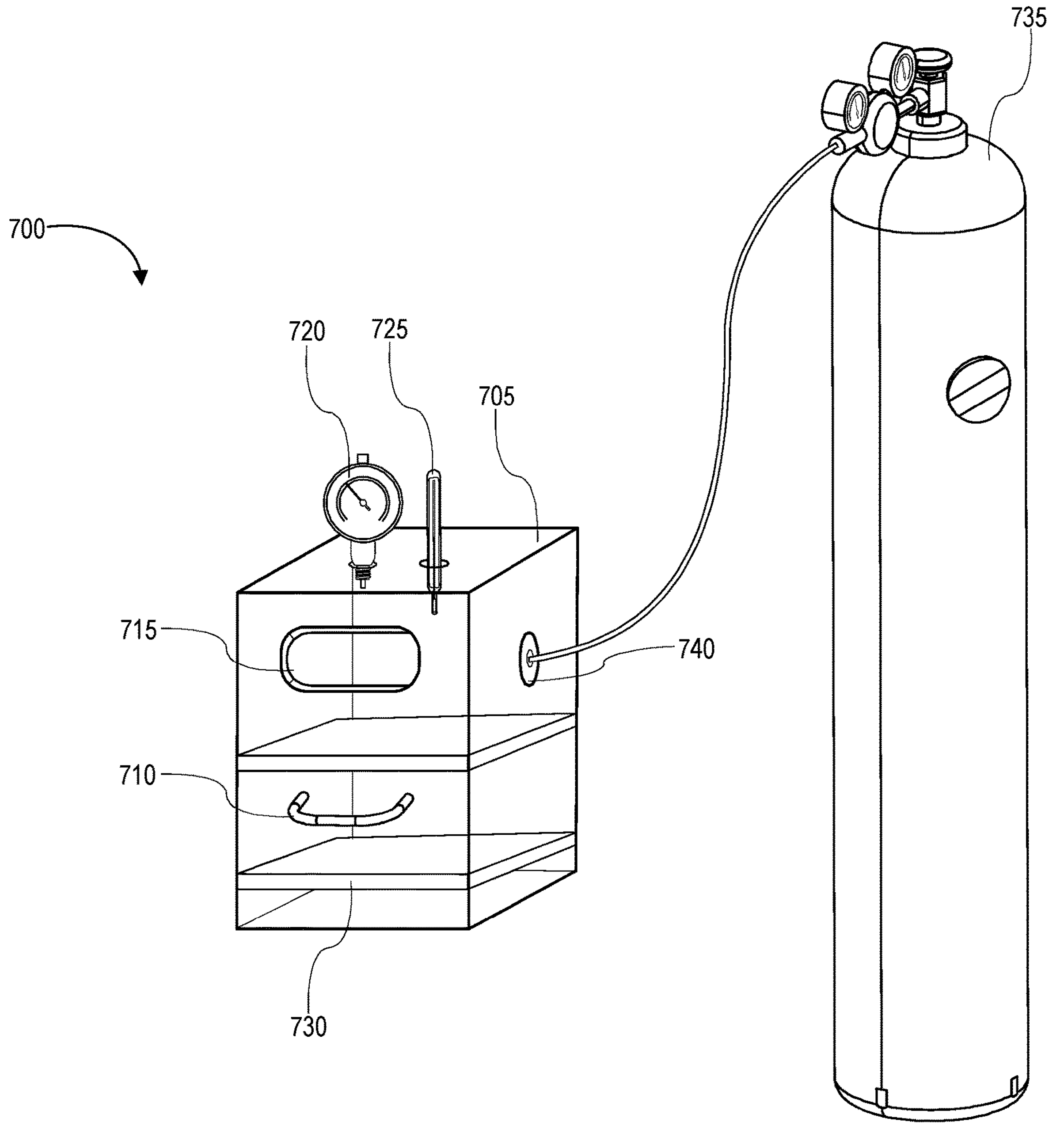
FIG. 7 is an illustration of an embodiment of a hyperbaric chamber with a door, a window, internal platforms, and a gas supply.

Referring to FIG. 7, FIG. 7 is an illustration 700 of an embodiment of a hyperbaric chamber 705 with a door 710, a window 715, inner platforms 730, and a gas supply 735. As shown in FIG. 7, the hyperbaric chamber 705 has a cubic shape, which is different from the more cylindrical shape of embodiments of the hyperbaric chambers shown in FIGS.

1-6. The cubic shape, which is possibly less structurally stable than the cylindrical shape, may lend itself to some advantages over the cylindrical shape. For instance, appending parts such as windows to the hyperbaric chamber 705 may be easier where the sides of the hyperbaric chamber 705 are flat because the parts themselves are generally flat. Thus, appending various additions to the hyperbaric chamber 705 may be more feasible with the cubic shape than with the cylindrical shape.

Further, the inner platforms 730 may efficiently fit inner walls of the hyperbaric chamber 705. When the door 710 is opened, the inner platforms 730 may be configured to smoothly slide in and out of the hyperbaric chamber 705. The flat sides of the inner walls allow for the inner platforms to be configured to make contact with the inner walls around a circumference of the inner platform; which would be challenging with rounded walls.

One or more ports of the hyperbaric chamber 705 may be configured to accept sensors that measure conditions inside the hyperbaric chamber. As shown in FIG. 7, a barometer 720 may measure a barometric pressure inside the hyperbaric chamber 705. The barometer 720 may comprise a barometric pressure sensor that is exposed to an inside of the hyperbaric chamber 705. The barometer 720 may traverse the hyperbaric chamber 705 via a port so that the barometer may display a measurement that is visible from outside the hyperbaric chamber 705. The port may be sized to fit the various sensors, whereby the sensors may be configured to seal the port such that the hyperbaric chamber 705 may be pressurized when the sensor is in place.

Similar to the barometer 720, a thermometer 725 may be fixed to the hyperbaric chamber such that a portion of the thermometer that takes temperature measurements is exposed to an inside of the hyperbaric chamber 705. A portion of the thermometer from which measurements can be read, is on the outside of the hyperbaric chamber 705. Like the barometer 720, the thermometer 725 may seal the hyperbaric chamber 705 to prevent escape of gas when the hyperbaric chamber 705 is pressurized. Other sensors that are not shown in FIG. 7 may include a pressure sensor and a gas oxygen sensor.

The door 710 may be shaped to comprise one side of the hyperbaric chamber 705. In various embodiments, the door 710 may be fixed to the hyperbaric chamber 705 on one or more hinges. The door 710 may be sealed shut by a latch or bolts when the hyperbaric chamber 705 is pressurized. When the door 710 is opened, the one or more inner platforms 730 may be easily adjusted or removed. In various embodiments, a height of the inner platforms 730 may be adjusted by sliding the inner platforms 730 into slots on the inside of the hyperbaric chamber 705.

One or more gas supplies 735 may provide pressurized gas to the hyperbaric chamber 705 through one or more sealed ports 740. In various embodiments, such as the embodiment shown in FIG. 1, the hyperbaric chamber 705 may be connected to more than one gas supply 735 so as to adjust the composition of air inside the hyperbaric chamber 705.

Figure 8:
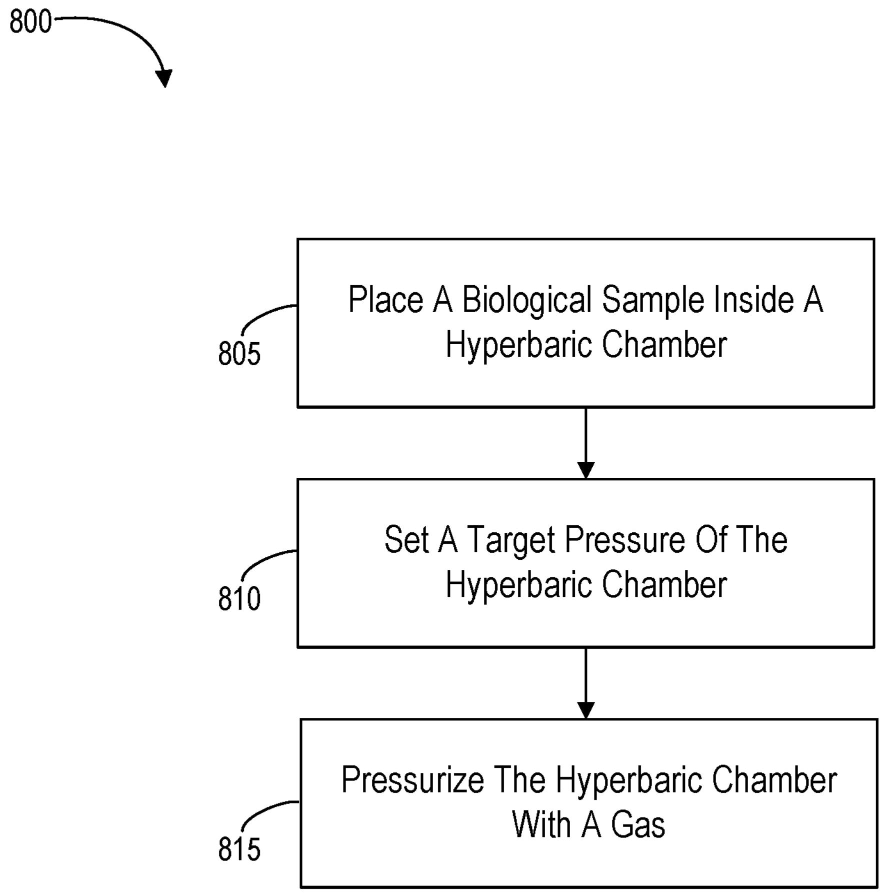
FIG. 8 is a flow diagram for a process of using a hyperbaric chamber.

Referring to FIG. 8, FIG. 8 is a flow diagram for a process of using a hyperbaric chamber. The hyperbaric chamber may comprise various sizes and dimensions, such as various sizes disclosed herein. For example, the hyperbaric chamber may have a mostly cylindrical shape with a height of about 29 inches and a diameter of about 9 inches.

At step 805, a user may place a biological sample inside a hyperbaric chamber. The biological sample may comprise various samples for in vitro, in vivo, and/or live animal testing. The biological sample may be placed on an adjustable platform inside the hyperbaric chamber. The hyperbaric chamber may include one or more sensors that can take measurements of conditions inside the hyperbaric chamber, including measurements of the biological samples.

At step 810, a user may set a target pressure of the hyperbaric chamber. The user may set the target pressure using a regulator that is configured to release compressed gas into the hyperbaric chamber until the hyperbaric chamber reaches the target pressure. In various embodiments, the regulator may include a timer. The target pressure of the regulator may change based on a program that is responsive to the timer.

At step 815, the user may pressurize the hyperbaric chamber. In various embodiments, the user may release a value that allows the regulator to pressurize the hyperbaric chamber. In an exemplary embodiment, the hyperbaric chamber includes a thermometer and pressure sensor. If the temperature increases with the pressure according to the ideal gas law, the regulator may be configured to slow the process of pressurization to allow the gas inside the hyperbaric chamber to equilibrate with temperature on the outside. Similarly, the hyperbaric chamber may be configured to slow the process of depressurizing to reduce cooling as pressure is reduced inside the hyperbaric chamber.

Many variations may be made to the embodiments described herein. All variations are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

The invention claimed is:

1. A hyperbaric chamber, the hyperbaric chamber comprising:

a chamber that is configured to seal a volume of air, the chamber comprising:

one or more ports that are configured to connect to an air supply;

one or more platforms inside the chamber;

one or more sensors that monitor an environment inside the chamber, the one or more sensors inside the hyperbaric chamber configured to measure light from a light source, the one or more sensors configured to take vital measurements of a biological sample inside the chamber to determine an adverse effect on the biological sample, the vital measurements comprising an activity level of the biological sample; and the chamber further configured to modify a property of the volume of air responsive to the vital measurements, the property configured to cause a positive effect on the biological sample, the one or more sensors comprise a camera configured to record an optical measurement of a rate of growth of the biological sample, wherein the one or more sensors comprise a thermometer and a pressure sensor;

wherein the chamber further comprises a regulator that is configured to adjust a speed of pressurization responsive to a temperature measurement from the one or more sensors, and wherein the regulator is further configured to adjust the speed of the pressurization of the volume of air responsive to a temperature change of the volume of air that accompanies a pressure change of the volume of air when the temperature change is not equilibrated with a temperature change outside the hyperbaric chamber.

2. The hyperbaric chamber of claim 1, wherein the chamber is configured to seal a pressure of up to 60 pounds per square inch.

3. The hyperbaric chamber of claim 2, further comprising a regulator that maintains the pressure inside the chamber; and wherein the one or more sensors comprise a pressure sensor for gas inside the chamber.

4. The hyperbaric chamber of claim 1, further comprising one or more window ports.

5. The hyperbaric chamber of claim 1, further comprising a control that is accessible from an individual outside the chamber, wherein the control transmits a signal to activate one or more components inside the chamber.

6. The hyperbaric chamber of claim 5, wherein the chamber comprises a stainless steel material;

wherein the chamber further comprises a cylinder; and wherein the cylinder has a length of between 26 to 32 inches.

7. The hyperbaric chamber of claim 6, wherein the length of the cylinder is 29 inches.

8. The hyperbaric chamber of claim 1, further comprising a lighting source inside the chamber.

9. The hyperbaric chamber of claim 1, wherein the one or more sensors comprise a thermometer; and wherein the thermometer is configured to wirelessly transmit a temperature value.

10. The hyperbaric chamber of claim 1, wherein the vital measurements comprise camera images of the biological sample.

11. The hyperbaric chamber of claim 1, wherein a gas concentration is modified based on the rate of growth of the biological sample.

12. The hyperbaric chamber of claim 11, wherein the gas concentration is modified to maximize the rate of growth.

13. The hyperbaric chamber of claim 1, wherein the camera is further configured to record an optical measurement of a rate of growth of a bacteria sample.

14. The hyperbaric chamber of claim 1, wherein the camera is further configured to record an optical measurement of a rate of growth of a fungi sample.

15. A method, the method comprising:

placing a biological sample inside a hyperbaric chamber;

pressurizing the hyperbaric chamber with a gas;

wherein the hyperbaric chamber comprises:

a stainless steel chamber;

one or more sensors inside the stainless steel chamber, the one or more sensors configured to measure light from a light source, the one or more sensors comprise a camera configured to record an optical measurement of a rate of growth of the biological sample; and one or more platforms inside the stainless steel chamber;

wherein the one or more sensors comprise a thermometer and a pressure sensor;

wherein the chamber further comprises a regulator that is configured to adjust a speed of pressurization responsive to a temperature measurement from the one or more sensors, receiving a vital measurement of the biological sample from at least one of the one or more sensors, the vital measurement comprising an activity level of the biological sample;

determining an adverse effect on the biological sample;

adjusting a pressure of the gas responsive to the vital measurement; the adjusting configured to cause a positive effect on the biological sample; and adjusting the speed of the pressurization of the volume of air responsive to a temperature change of the volume of air that accompanies a pressure change of the volume of air when the temperature change is not equilibrated with a temperature change outside the hyperbaric chamber.

16. The method of claim 15, wherein the gas comprises 100% oxygen;

further comprising setting a target pressure of the hyperbaric chamber; and wherein the pressurizing comprises adjusting a pressure of the gas inside the hyperbaric chamber to meet the target pressure.

17. The method of claim 16, wherein the setting comprises:

inputting one or more gas pressures; and inputting a time to set each of the one or more gas pressures.

18. A hyperbaric chamber, the hyperbaric chamber comprising:

a chamber that is configured to seal a volume of air at a pressure of up to 60 pounds per square inch, the chamber comprising:

one or more ports that are configured to connect to an air supply;

one or more platforms inside the chamber;

one or more sensors that monitor an environment inside the chamber, the one or more sensors inside the hyperbaric chamber configured to measure light from a light source, the one or more sensors comprise a camera configured to record an optical measurement of a rate of growth of a biological sample;

one or more window ports;

a regulator that maintains the pressure inside the chamber;

a control that is accessible from an individual outside the chamber;

wherein the one or more sensors comprise a pressure sensor for gas inside the chamber, wherein the control transmits a signal to activate one or more components inside the chamber; and wherein at least one of the one or more sensors are configured to measure the biological sample to determine an adverse effect on the biological sample;

wherein the chamber is further configured to modify a property of the volume of air, to achieve a positive effect on the biological sample, responsive to a vital measurement of the biological sample from the one or more sensors, the vital measurement comprising an activity level of the biological sample, wherein the one or more sensors comprises a thermometer;

wherein the regulator is configured to adjust a speed of pressurization responsive to a temperature measurement from the one or more sensors, and wherein the regulator is further configured to adjust the speed of the pressurization of the volume of air responsive to a temperature change of the volume of air that accompanies a pressure change of the volume of air when the temperature change is not equilibrated with a temperature change outside the hyperbaric chamber.

* * * * *